(No Model.)
E. JORDAN.
STEAMING OVEN.
No. 246,585. Patented Aug. 30, 1881.
FIG-1-
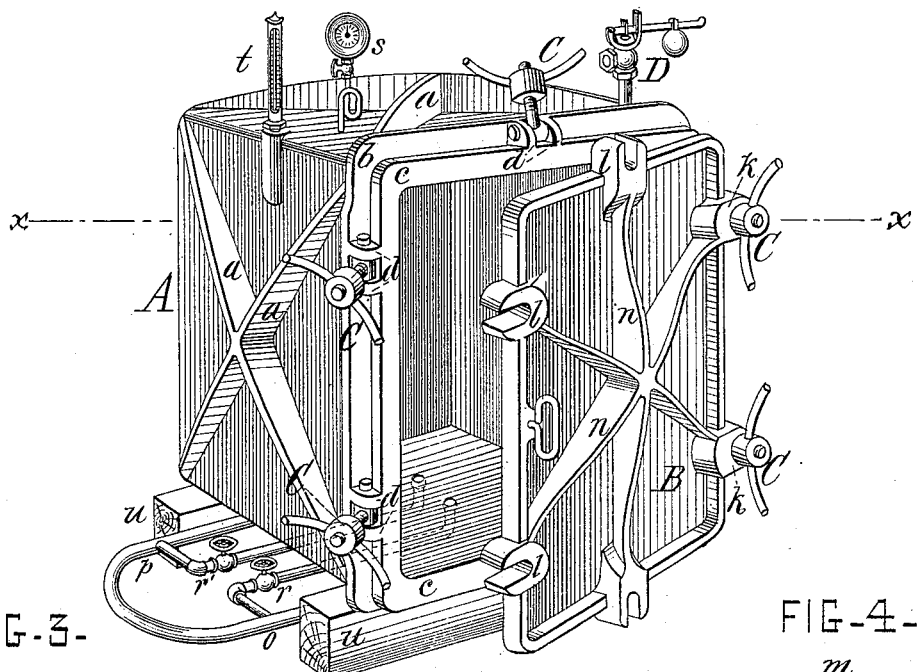
FIG-3-
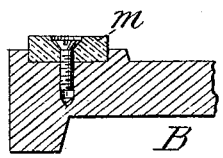
FIG-4-
FIG-2-
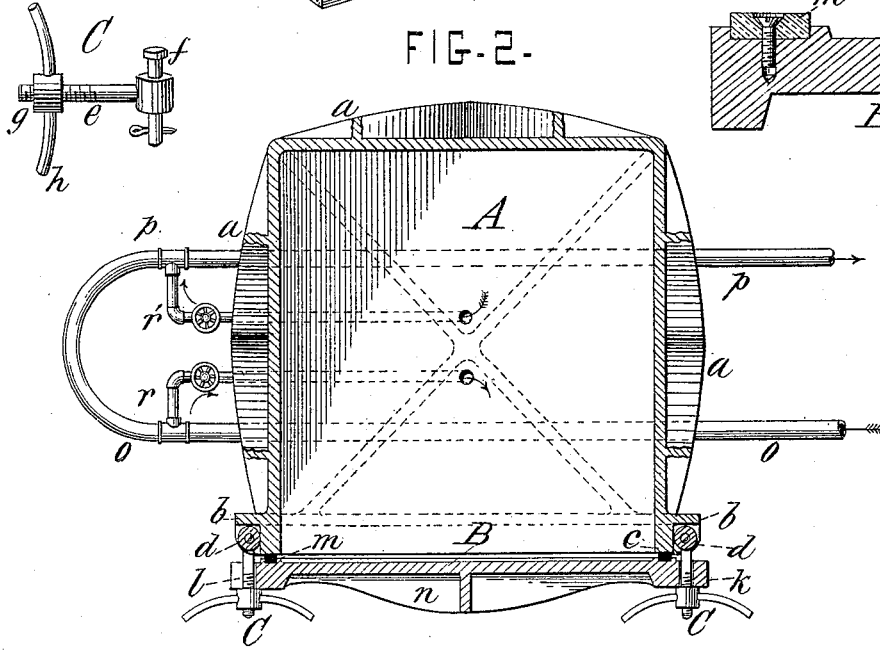
Witnesses.
C. Spiro
W. Booth
Inventor.
Edmund Jordan
by Chas. M. Higgins
Attorney.

100
UNITED STATES PATENT OFFICE.

EDMUND JORDAN, OF BROOKLYN, ASSIGNOR TO ELIPHALET W. BLISS, OF NEW YORK, N. Y.

STEAMING-OVEN.

SPECIFICATION forming part of Letters Patent No. 246,585, dated August 30, 1881.

Application filed June 6, 1881. (No model.)

*To all whom it may concern:*

Be it known that I, EDMUND JORDAN, of Brooklyn, Kings county, New York, have invented certain new and useful Improvements in Steaming or Cooking Chests or Ovens, of which the following is a specification.

My invention aims to provide a steaming oven or tank more especially for the steaming of canned goods when placed fresh in the cans, so as to cook, or partly cook, the same and expel the air from the cans previous to sealing the vent-holes thereof. For this purpose it is desirable to have a tank of strong and simple construction, so formed and arranged that it may be readily opened or closed to quickly admit or remove the cans, and which will heat the same rapidly when inserted, and apply the heat economically and in such a way that it may be easily regulated to suit different kinds of fruit, vegetables, or meats, each of which generally requires a special temperature and duration of heat for the best effect, and which will also enable such temperature to be automatically maintained as long as desirable for the proper treatment of each article.

My invention aims to fulfill these conditions, and to this end embodies a number of novel features, as hereinafter fully set forth.

Figure 1 of the drawings annexed gives a perspective view of my improved steam oven or tank with the door shown partly open, and Fig. 2 is a sectional plan thereof on line $x\ x$ of Fig. 1, with the door closed and held tight by its clamps. Fig. 3 is a detail view of one of these clamps; and Fig. 4, a fragmentary section of the door, showing the attachment of the gasket.

Steam-ovens heretofore made for the special purpose above mentioned—such as shown in Patent No. 221,294, November 4, 1879—have usually been cylindrical, placed in upright position, with the mouth-opening at the top and the lid or cover arranged to lift off bodily, the lid being thus removed by a crane, by which also the cage containing the cans is lowered into and raised out of the cylinder. The cylindrical form, while favorable to strength, is, however, inconvenient if placed upright with the mouth at the top, and incapacious if placed on its side.

On reference to the drawings it will be observed that my improved oven, A, is of square or flat sided form, with its mouth-opening on the side, and is provided with a hinged or swinging door, B, which plan is obviously much more convenient and capacious as regards the insertion and removal of the canned goods. The necessary strength is obtained with this square form by casting the entire oven in one piece, without break or joint, and with deep flanges $a\ a$ extending across its flat sides, preferably in diagonal position, as illustrated, whereby the construction is rendered very strong and simple, as will be readily appreciated. The oven is preferably made about thirty-seven inches square or cubic on its interior; but of course the size may vary, its walls being preferably three-quarters of an inch thick, smooth on the inside, but having the stiffening-flanges $a\ a$ on the outside, in about the proportionate thickness and depth shown. A wide rim or flange, $b$, surrounds the mouth of the oven, projecting at right angles with the sides, and in being integral with these walls gives great strength to this part of the oven, which would be otherwise weak by reason of the open side or mouth. A lip, $c$, rises from this rim around the mouth, forming the edge of the oven, and this is planed or turned off level and smooth to form a packing-surface for the door to seat against. In the angle between the lip and flange $c\ b$ small brackets $d\ d$ are formed in pairs at intervals around the rim, as illustrated, and between the same are hinged swinging clamps C, by which the door is clamped tight over the mouth, as shown in Fig. 2. Each clamp consists of an eyebolt, $e$, the head or eye end of which is socketed between the brackets $d\ d$ and pivoted thereto by a bolt or pin, $f$, (see Fig. 3,) while the threaded end receives a nut, $g$, having projecting handles $h\ h$, whereby the nut may be forcibly turned when required to clamp the door.

The door B is formed with two projecting eyes, $k\ k$, on its hinging side, and with forked projections $l\ l$ on the other sides, corresponding with the several clamps C, as illustrated. The clamps on the hinging side of the oven are engaged with the eyes $k\ k$ of the door, as illustrated, so that they thus form simple and effective hinges, on which the door can freely swing, yet also act as clamps to tighten the door on its hinging side when closed. The other clamps readily swing into engagement with the forks *l l* on the other sides of the door when the same is closed, and by tightening the nuts *g g* the door is thus tightly clamped at all sides over the mouth of the oven, a gasket, *m*, embedded in its face, as indicated in Figs. 2 and 4, forming a tight joint with the lip *c*, as will be understood. The door is cast about three-fourths of an inch thick, same as the walls of the oven, and it is smooth or level on its interior face, with the exception of a shallow trough around its margin, in which the gasket is embedded, as shown. The outer side of the door has a raised rim running around its edge, and it will be observed from Fig. 1 that it is further strengthened by a number of diametrical flanges, *n n*, which radiate from the center to each of the eyes and forks *k l*, with which the clamps engage, so that the door is thus specially strengthened along the lines of the clamps, and the strain of the clamps is thus conveyed through these flanges and evenly distributed over the metal of the door, thus rendering the construction especially strong and light. It may be also noted that the peculiar connection of the door with the oven and the form of its clamps and hinges enable the door to be readily swung open or shut and clamped or unclamped, as occasion requires, in a very rapid and easy manner.

In the practical use of these ovens they are designed to be arranged in succession along the side of the cooking or steaming room, being supported on beams *u u*, as illustrated in Fig. 1, and connected with steam-pipes, as shown. Tracks are laid along the floor in front of the ovens, so that when the doors are opened the cages containing the raw canned goods may be easily rolled on trucks before the mouth of the ovens, and thence slid off the same into the oven, after which the door may be closed and the contents subjected to the action of the steam as long as desirable.

I prefer to connect the steam-pipes in the manner shown in Figs. 1 and 2, which has advantages—that is, *o* indicates the main steam-pipe, conveying the live steam from the boiler to each of the ovens by branches *r*, opening into the bottom of the kettle, as illustrated, and *p* indicates the return-pipes, from which a similar branch, *r'*, opens into the kettle alongside of the steam-opening, and by which the water of condensation is conducted into the return-pipe, and finally returned to the boiler, according to the general plan of steam-circuits, thus not only conveniently removing the condensation from the oven as fast as formed, but economizing the heat thereby. Each of the branches *r r'* is provided with valves, as shown, whereby the supply of steam to the oven may be regulated as desired or shut off altogether when the door is to be opened.

To indicate the degree of heat and pressure in the oven and enable the same to be regulated as desired, according to the nature of the contents, a number of instruments are inserted in the top of the tank, as illustrated in Fig. 1—that is, a gage, *s*, to show the pressure, a thermometer, *t*, to show the temperature, and an adjustably-weighted or automatic escape-valve, D, to enable a definite uniform pressure to be automatically maintained, suited to the nature of each article to be cooked, which forms one advantage of my apparatus, as will be now described. For this valve I prefer to employ an ordinary form of safety-valve, as illustrated; but any other adjustable automatic escape-valve may be used, as its function is not that of a mere safety-valve, as will hereinafter appear. I prefer, however, to have the pressure-range of this valve such as to be less than that which the oven can safely stand—say thirty pounds to the square inch—so that the valve can never be set higher than a point which will be always safe for the strength of the tank, whereas the range below this will more than suffice for any degree of heat desired for cooking any of the usual canned goods.

The action of my improved oven is therefore as follows: The canned goods being inserted and the door tightly closed, the valves of the branches *r r'* are opened and the steam thus admitted. The valve D may now be opened to let the air escape, and then allowed to close, so as to confine the steam in the kettle. It will be hence observed that as the steam fills the tank and comes in direct contact with the cans it condenses thereon, and the condensation is carried off by the branch *r'*, the heating effect being thus very rapid and economical by reason of the direct contact and condensation of the steam on the cans, while this condensation is returned to the pipes, instead of being wasted, as heretofore. As the heating continues the thermometer *t* will show the temperature, and if a low heat is required—not over 212°—this heat may be raised or lowered by turning the steam off and on at intervals, so as to prevent the rise of temperature by the accumulation of any pressure in the oven. Where, however, a high heat is required, as is the case with certain articles—for instance, green corn—the steam is allowed to accumulate under pressure in the oven, and thus raise the temperature correspondingly. In this case the adjustable valve D is set to the pressure corresponding to the temperature required for the special article being treated, and the valves of the branches *r r'* are opened sufficiently wide to admit the steam in the necessary volume to fill the oven and just blow off slowly at the valve, so as to maintain a uniform pressure and temperature for which the valve is set, yet not appreciably waste the steam. By this means it will be observed that the pressure and temperature determined for the article being treated will be kept constant as long as desired without requiring attention, whereas heretofore it has been usual to regulate the heat by opening and closing the valves by hand, according as the thermometers indicated, which requires constant attention and causes waste of steam and is imperfect in action.

My improved chest or oven thus combines many advantages, and is not only strong and simple in construction and convenient in operation, but uses the heat economically and enables any desired temperature to be maintained constantly for any length of time without requiring attention, and thus not only saves labor, but improves the quality of the articles treated, and thereby effects an important improvement.

What I claim is—

1. A square or flat sided cooking chest or oven adapted to be subjected to internal steam-pressure, cast in one piece with crossed radial or diagonal flanges which project from the exterior of its flat sides, substantially as herein shown and described.

2. A square or flat sided chest or oven, open at one side, and formed with a flange or rim, $b$, surrounding the same and projecting at right angles from its flat walls, with crossed radial flanges $a\ a$ projecting from the exterior of its flat sides or walls, and the whole formed in one casting, substantially as and for the purpose set forth.

3. The combination, with a chest or oven, of the swinging lid or door, formed with two eyes, $k\ k$, on its hinging side, and forked projections $l\ l$ on its other side or sides, with swinging clamps, substantially such as described, hinged to the mouth of the kettle, and serving as hinges and clamps on the hinging side and as clamps on the other side or sides of the lid, substantially as herein shown and described.

4. The combination, with a tank or kettle formed with the projecting mouth-rim $b$, of the brackets $d\ d$, formed on said rim, and swinging clamp-bolts $e\ e$, pivoted to said brackets, substantially as and for the purpose set forth.

5. The combination, with a tank or kettle, of a lid or door, B, formed with marginal eyes or forks $k\ l$, or both, adapted to be engaged by clamps, and with diametrical flanges $n\ n$, radiating from the center of the lid, or thereabout, to the said eyes and forks, substantially as and for the purpose set forth.

EDMUND JORDAN.

Witnesses:
E. WOLFF,
CHAS. M. HIGGINS.